United States Patent
Someno et al.

(10) Patent No.: US 7,330,284 B2
(45) Date of Patent: Feb. 12, 2008

(54) METHODS FOR CREATING PRINTING DATA AND FOR TRANSFERRING PRINTING DATA

(75) Inventors: Masahiro Someno, Nagano (JP); Hajime Nishizawa, Nagano (JP); Shoji Kojima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/534,504

(22) Filed: Sep. 22, 2006

(65) Prior Publication Data

US 2007/0070413 A1    Mar. 29, 2007

Related U.S. Application Data

(63) Continuation of application No. 09/826,308, filed on Apr. 5, 2001.

(30) Foreign Application Priority Data

Apr. 5, 2000  (JP) ............................. 2000-103194
Apr. 5, 2000  (JP) ............................. 2000-103195

(51) Int. Cl.
G06F 15/00   (2006.01)
G06K 1/00    (2006.01)

(52) U.S. Cl. ..................... 358/1.15; 358/1.15; 358/1.17

(58) Field of Classification Search ................ 358/1.1, 358/1.9, 1.11–1.18, 2.1, 524; 399/16
See application file for complete search history.

(56) References Cited

U.S. PATENT DOCUMENTS 5,740,335 A    4/1998  Takayanagi et al.

(Continued)

FOREIGN PATENT DOCUMENTS

EP    0 895 184 A2    2/1999

(Continued)

OTHER PUBLICATIONS

Patrick Powell, "LPRng-HOWTO", [XP07901415], Feb. 11, 2000; URL:http://web.mit.edu/source/third/lprng/doc/LPRng-HOWTO.ps.

(Continued)

*Primary Examiner*—Gabriel Garcia
*Assistant Examiner*—Thierry L. Pham
(74) *Attorney, Agent, or Firm*—Sughrue Mion, PLLC

(57) ABSTRACT

A printer driver (31) divides printing data, which controls printing of a printer, into one or plural data to record the data, to each of which information for discriminating the data is added, as a sub-file (70), as well as creates a sub-file name data (61) for specifying the sub-file (70) and records it as a spooling file (60). The printer driver (31) also creates a file (71) for writing a print controlling command and records the file name thereof in the spooling file (60). When a print cancellation instruction is received during the printing performance, a print cancellation command is written in the file (71). The print processor (42) refers the print spooling file (60) to read the sub-file (70) in order, so that the printing data included in the file would be transferred to a printer (20). The completely transferred sub-file is deleted. The print processor (42) monitors the file (71) while the printing data is transferred to the printer (20), and stops the following printing when the cancellation command is written.

1 Claim, 11 Drawing Sheets

U.S. PATENT DOCUMENTS

| | | |
|---|---|---|
| 6,359,696 B1 * | 3/2002 | Hori et al. .................. 358/1.13 |
| 6,433,882 B1 * | 8/2002 | Mori et al. ................. 358/1.13 |
| 6,665,082 B1 | 12/2003 | Takeoka et al. |
| 6,804,018 B1 | 10/2004 | Mochizuki |

FOREIGN PATENT DOCUMENTS

| | | |
|---|---|---|
| JP | 07-165810 A | 6/1995 |
| JP | 10-143339 | 5/1998 |
| JP | 10-143339 A | 5/1998 |
| JP | 09-046741 A | 9/1998 |
| JP | 10-283416 | 10/1998 |
| JP | 11-065788 | 3/1999 |

OTHER PUBLICATIONS

L. McLaughlin, III, "RFC-1179: Line Printer Daemon Protocol", IETF Standard, [XP015006123], Aug. 1990.

* cited by examiner

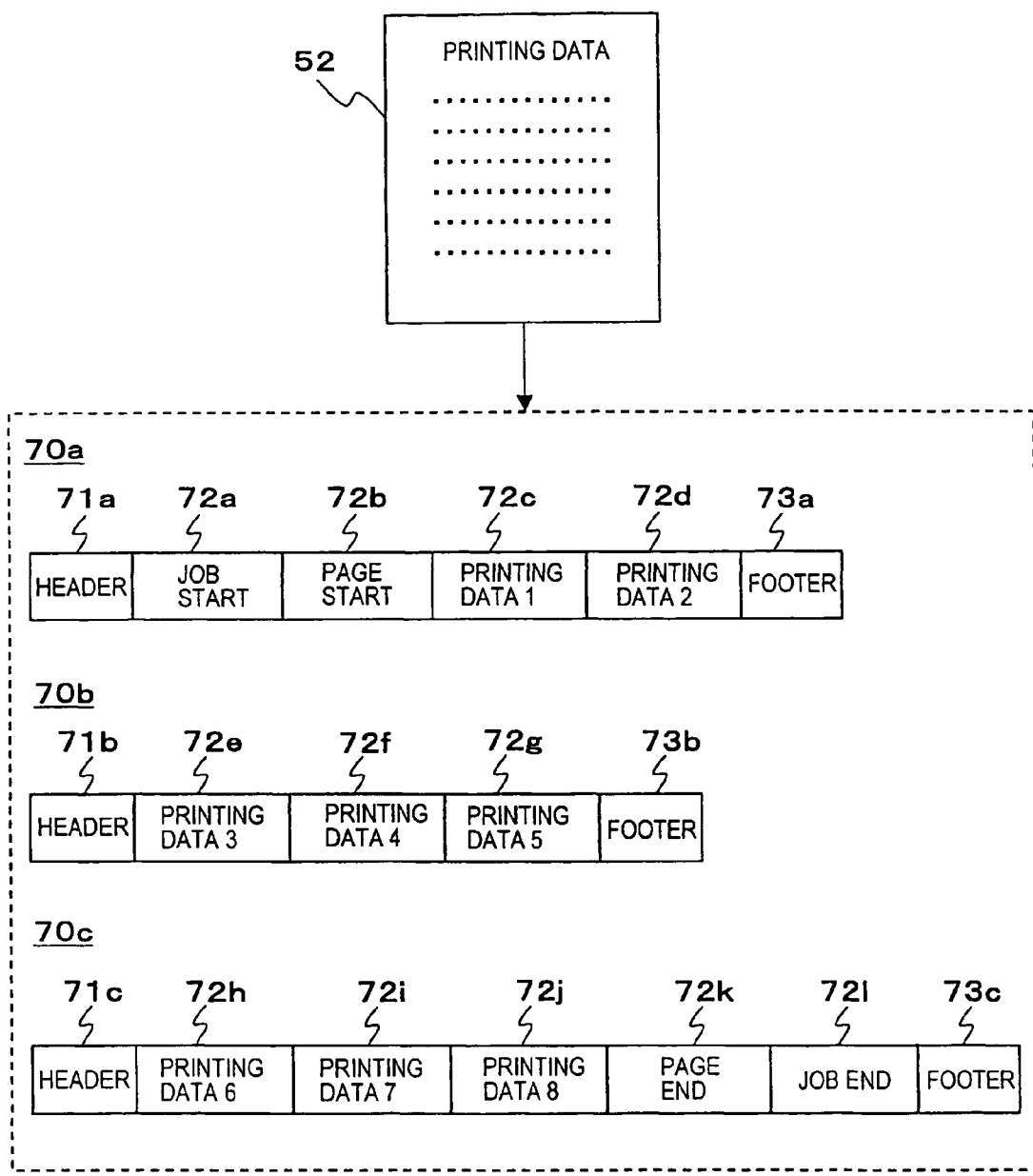

FIG.6
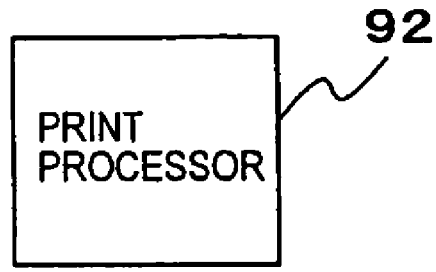
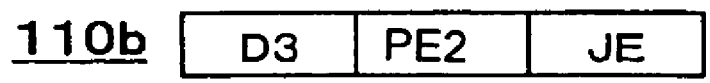

METHODS FOR CREATING PRINTING DATA AND FOR TRANSFERRING PRINTING DATA

CROSS-REFERENCE TO RELATED APPLICATIONS

This is a Continuation of application Ser. No. 09/826,308 filed Apr. 5, 2001. The entire disclosure of the prior application is considered part of the disclosure of the accompanying continuation application and is hereby incorporated by reference.

TECHNICAL FIELD OF THE INVENTION

The present invention relates to a printing process in a computer system, particularly to a print spooling technology.

BACKGROUND OF THE INVENTION

A computer system adopts a technique of print spooling when performing printing for the purposes such as to prevent a calculation process of a main body of a computer system from delaying due to output to a printer, and to transmit data to the printer in order in response to a requirement of printer output from a computer connected to a network.

FIG. 10 is a block diagram showing an outline of a process when printing by a local-connected printer. Printing data created by a printer driver 231 (data described in a printer controlling language) is transmitted to a spooler 241, which is one of modules of a printing system 240 in an operating system. After receiving the printing data, the spooler 241 stores the printing data once in a hard disc as a spooling file 260. Then, a print processor 242, which is one of modules of the printing system 240, reads the spooling file 260 and transfers it to a printer 20.

FIG. 11 is a block diagram showing an outline of a process in plural sets of printing by a network-connected printer. In this drawing, the printer 20 connected to a server computer 280 prints printing data created by a client computer 210 connected to a network.

The client computer 210 stores printing data in a hard disc as the spooling file 260 as with the case of FIG. 1. Then, the printing data is transferred to a spooler 291 of the server computer 280.

After receiving the printing data, the spooler 291 of the server computer 280 also stores the printing data in a hard disc as a spooling file 300. Then, a print processor 292 reads the spooling file 300 and transfers it to the printer 20.

DISCLOSURE OF THE INVENTION

Some operating systems, however, have a printer system such that printing data is held until the completion of printing once the printing data is spooled in a hard disc during printing by a local-connected printer. Some spooling files 260 have a size over a few hundred mega-bites, depending on a matter to be printed. Thus, it is difficult to say that holding such data until the completion of printing is effective to use hard disc resources.

There is also a problem that once a printing process has been started, cancellation cannot be performed or a quick cancellation process cannot be performed due to such as timing with a printing process by a computer even when an operator clicks a cancellation button so as to stop printing. Especially, after the print processor 242 starts transfer of printing data to the printer 20 after creating the spooling file 260, the cancellation process is much more uncertain.

Further, in performing plural sets of printing by a network-connected printer, the printer is adapted to create printing data for the plural sets and stored in a hard disc as the spooling file 260, and then, the printing data be transmitted to the spooler 291 of the server computer 280. Therefore, there is a problem that hard disc resources in both of the client computer 210 and the server computer 280 are used for the plural sets of the same printing data.

The first object of the invention is to reduce a time, which is occupied by the printing data, in a storing area of the external storing device when printing.

The second object of the invention is to quickly create and detect a print cancellation command based on a cancellation instruction from an operator during printing so as to ensure to stop transfer of printing data after the detection.

To solve the above problems, according to the invention, there is provided a program for enabling a computer to perform a process for reading and outputting printing data which controls a printer, wherein the process comprising:

a process for dividing printing data, which controls printing of the printer, into a plurality of data, adding information for discriminating the data to the respective data, and recording them as a file;

a process for creating data, which include information for specifying the above file, and recording it as a spooling file separately from the above file;

a process for reading the above print spooling file to refer to the above information for specifying the file;

a process for reading the specified file to output printing data included in the file; and a process for deleting a file including outputted printing data. According to the above, a file completely transferred to the printer can be deleted, so that it would be possible to shorten a time, which is occupied by the printing data, in a storing area of the external storing device.

Moreover, to solve the above problem, according to the invention, there is provided a program for enabling a computer to perform a printing process, wherein the process comprising:

a process for creating printing data, which controls a printer, in accordance with a printing instruction from a computer operator;

a process for determining whether or not a print processor available in the above computer can control transfer to a printer in accordance with printing data created by the above computer;

a process for creating a file for recording a command for controlling the printer when it is determined that the print processor can control printing to the printer in accordance with printing data created by the above printer driver; and a process for creating data, which include information for specifying the above file, separately from the above file. Here, the above command for controlling the printer may be a cancellation command for stopping printing. According to the above, the print cancellation command based on a cancellation instruction from an operator can be created and detected quickly.

BRIEF DESCRIPTION OF THE DRAWINGS

FIG. 3 is a schematic diagram for illustrating a process for dividing printing data into sub-files.

FIG. 6 is a schematic diagram for illustrating creation of a page-file.

BEST MODE FOR CARRYING OUT THE INVENTION

Embodiments according to the present invention will be described in detail with reference to drawings.

First of all, a first embodiment according to the invention will be described. In the first embodiment, the invention is applied for a computer system which carries out printing by a local-connected printer.

A structure of a computer system in the first embodiment will be described first.

Figure 8:
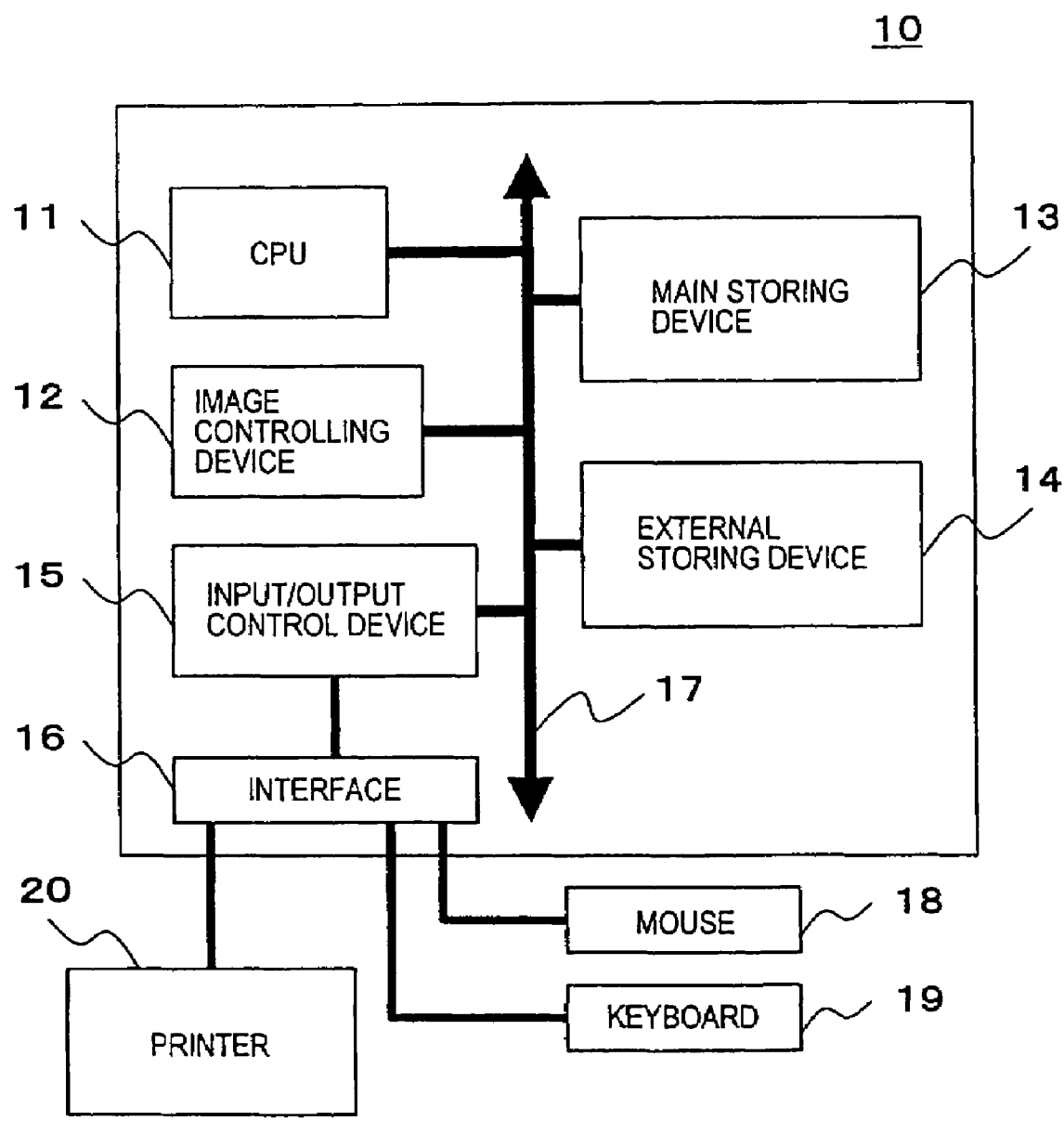
FIG. 8 is a block diagram showing a hardware configuration of a computer system.

FIG. 8 is a block diagram showing one example of a hardware configuration of a computer system. In FIG. 8, a computer 10 comprises a CPU 11, an image controlling device 12, a main storing device 13, an external storing device 14, an input/output control device 15, an interface 16, and a bus 17 for connecting therebetween.

The CPU 11 is an operation apparatus for controlling the computer 10 and has a function for demodulating and executing various kinds of instruction stored in the main storing device 13. The image controlling device 12 performs such as an operation for creating an image. The main storing device 13 has a function for temporally storing data, software, operating system or such, which is handled by the computer 10. The external storing device 14 is an auxiliary device, which has a storing medium available to read and write data, and serves to store software, a temporary file, and such. The external storing device 14 may be a hard disc, for example. The input/output controlling device 15 receives an instruction from an operator as well as carries out control when outputting data to an externally connected device. The interface 16 interfaces peripheral devices such as a printer 20 with the computer. The bus 17 is a transmission line through which a signal such as an address or data passes.

The computer 10 is connected through the interface 16 to a mouse 18, a keyboard 19 and the printer 20. The mouse 17 and the keyboard 19 receive an input from a computer operator. The printer 20 receives printing data from the computer 10 to carry out printing.

However, a computer system configuration is not limited to the one mentioned above.

Figure 9:
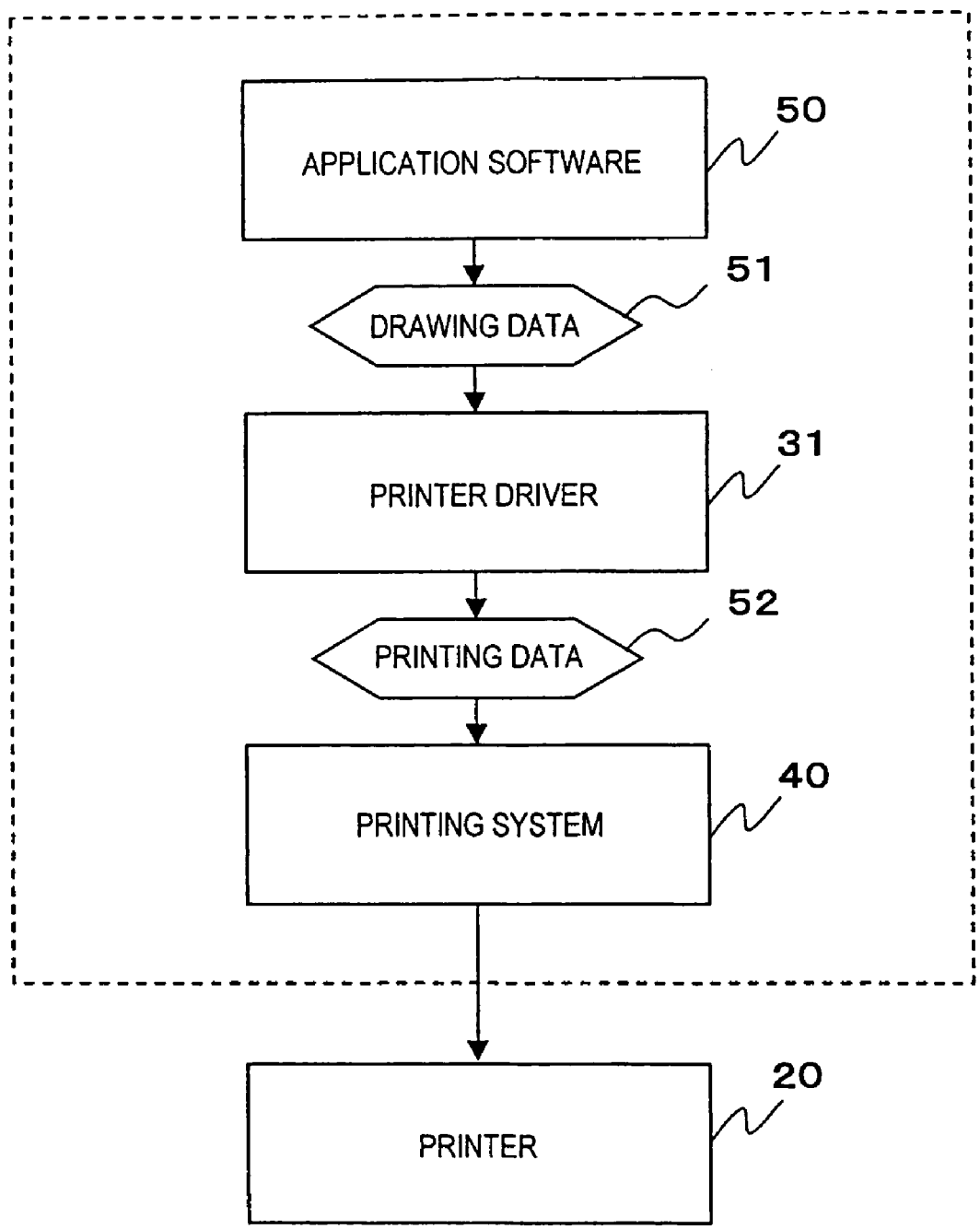
FIG. 9 is a block diagram illustrating an outline of a processing flow of printing data.
Figure 10:
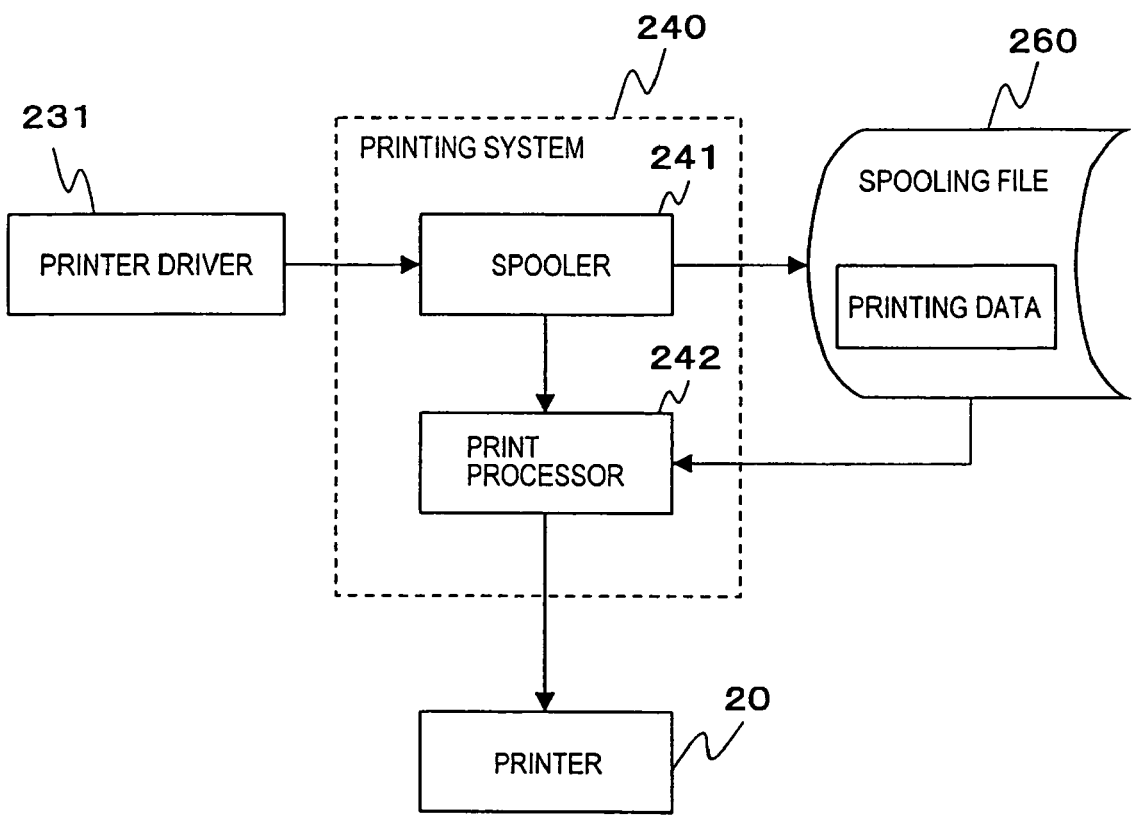
FIG. 10 is a block diagram showing an outline of a process in printing by a local-connected printer.
Figure 11:
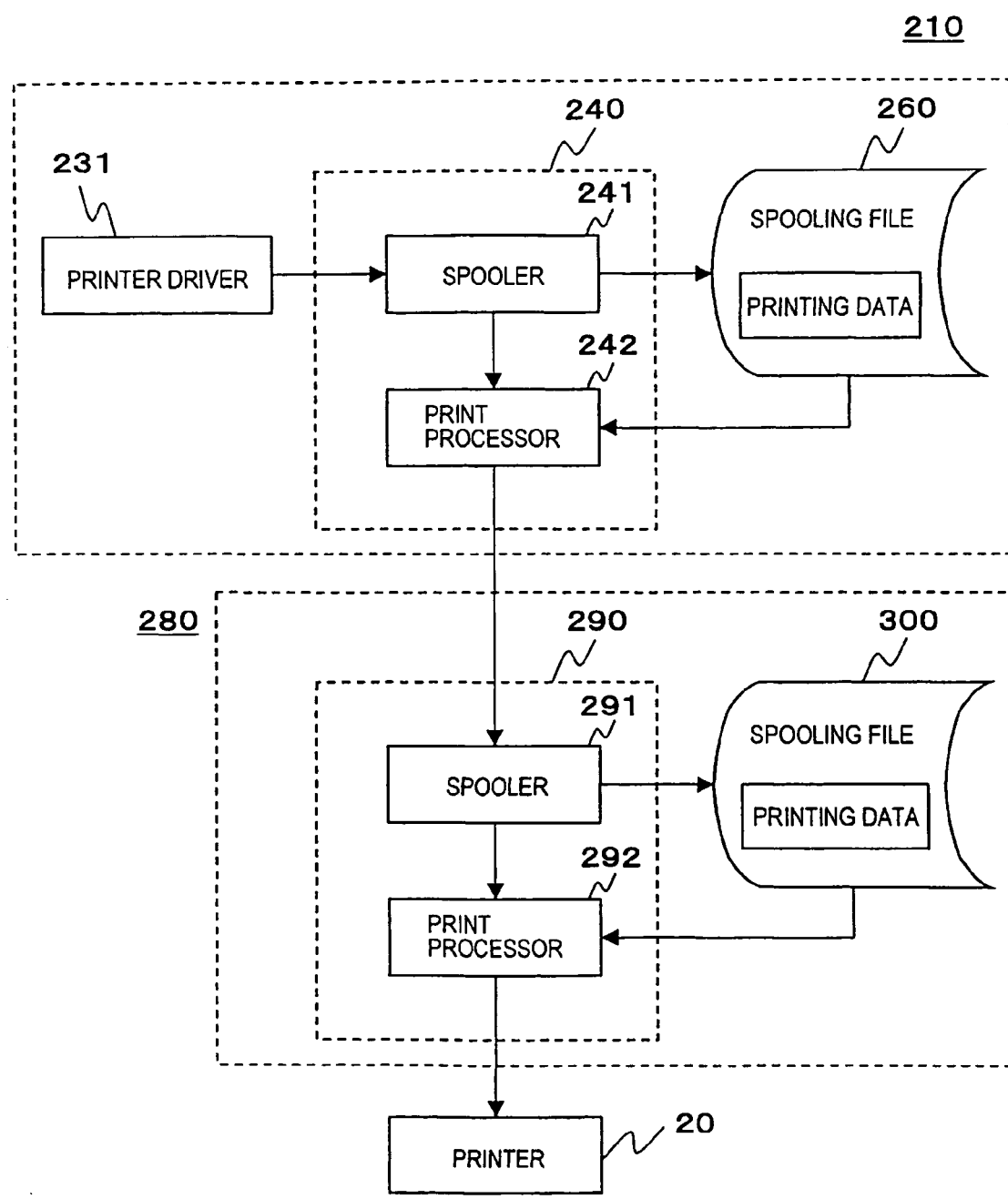
FIG. 11 is a block diagram showing an outline of a process in plural sets of printing by a network-connected printer.

Next, an outline of a processing flow of printing data when carrying out a printing command of application software such as a word processor or a graphic software will be described with reference to a block diagram shown in FIG. 9. In the drawing, application software 50, a printer driver 31 and a printing system 40 are software and stored in the main storing device 13. The CPU 11 refers to the software to perform a process shown in this drawing. The application software 50 is a program that is currently performed by the computer 10. After receiving a printing instruction from an operator, the application software 50 transmits drawing data 51 of a matter to be printed (mainly in a form of data for outputting an image) to the printer driver 31.

The printer driver 31 develops the transmitted drawing data 51 into printing data 52 (data described in a printer controlling language) to transmit it to the printing system 40.

The printing system 40 temporally stores the transmitted printing data 52 in the external storing device 14. Then, the printing system 40 transmits the stored printing data 52 to the printer 20 so as to complete a printing process in the computer 10.

The printer 20 starts printing after receiving the printing data 52.

Figure 1:
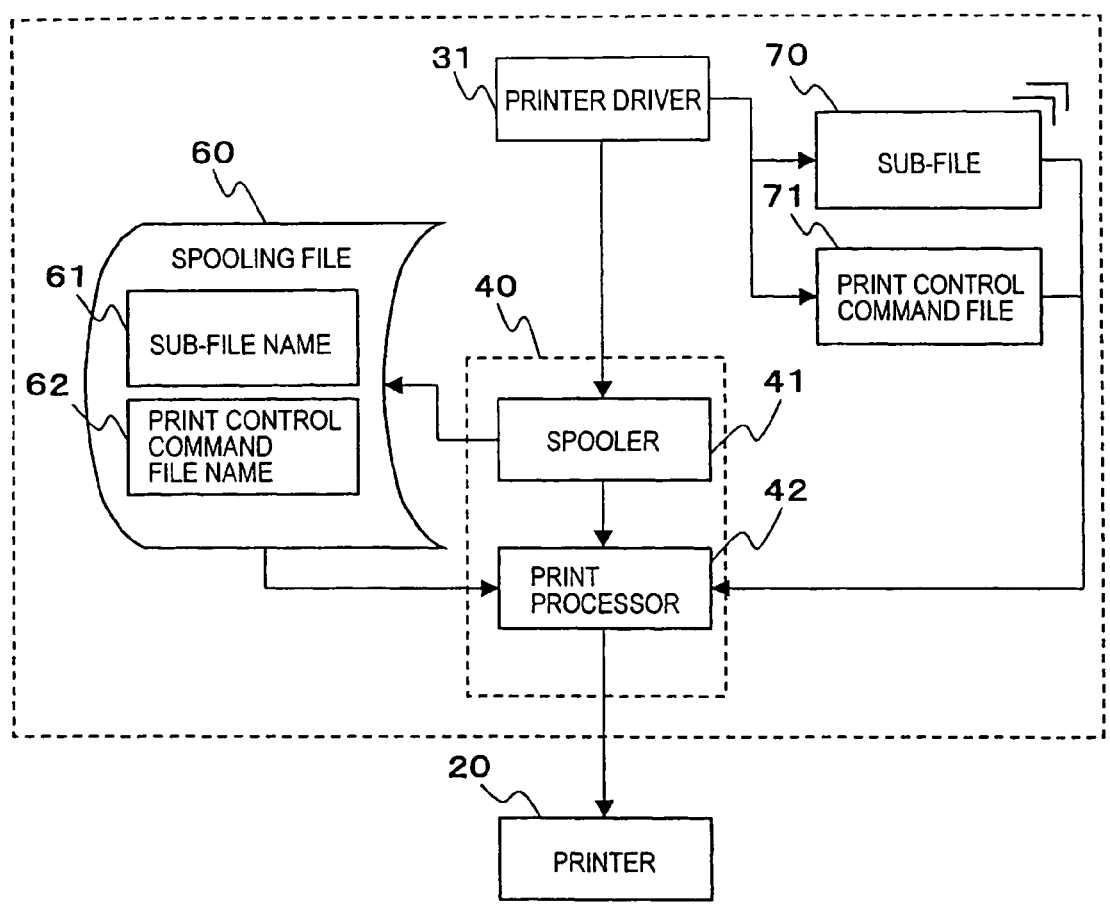
FIG. 1 is a block diagram illustrating an outline of a structure and process of a first embodiment.

Next, an outline of a structure and process of the first embodiment will be described with reference to a block diagram shown in FIG. 1. In the drawing, a spooler 41 and a print processor 42 are software modules constructing the printing system 40. The spooler 41 stores data, which are transmitted from a printer drive 31 and received by the printing system 40, in the external storing device 14. The print processor 42 reads the stored printing data to transmit to the printer 20. The print processor 42 is usually provided as a part of an operating system, but it is also possible to develop and use a print processor having unique specifications.

An outline of a process in the first embodiment, carried out by the configuration mentioned above will be described.

The printer driver 31 creates printing data, divides it into sub-files 70 mentioned later, and gives them a file name, and store them into the external storing apparatus 14. Then, the printer driver 31 transmits the file name of the sub-files 70 and the file name of a print controlling command file 71 to the spooler 41. The print controlling command file 71 is a file created by the printer driver 31 in such as the external storing device 14 in order to write therein a command for controlling a printer, for example, a cancellation instruction.

After receiving the above file names, the spooler 41 stores a sub-file name 61 and a file name 62 of the print controlling command file in the external storing device 14 as a spooling file 60.

Dividing the printing data into sub-files to store information such as a sub-file name in the spooling file, as described above, can decrease a size of the spooling file, so that a large matter to be printed, which cannot be developed into a spooling file due to a limitation of a file size, is allowed to be printed.

The print processor 42 refers to the sub-file name 61 of the spooling file 60 and opens corresponding sub-file 70 in order. Then the print processor 42 reads the sub-file 70 from the external storing device 14, restructures the printing data, and transmits the data to the printer 20. The sub-file 70 corresponding to the printing data transmitted to the printer 20 is deleted in order. The print processor 42 further refers to the print controlling command file name 62 from the spooling file 60 and monitors corresponding print control command file 71.

Next, operations of the printer driver 31 in the first embodiment will be described in detail. The printer driver 31 checks whether or not the print processor 42 is available to perform a printing process according to the invention. When it is available, the printer driver 31 performs the following process. When it is not available, the printer driver 31 performs a conventional process. Discrimination whether the print processor 42 is allowed to perform the printing process according to the invention is made, for example, by marking the printing process according to the present invention with a code for discrimination, and then determining that the printing process of the present invention is possible when the printer driver 31 detects the code.

After having started the printing process for a certain job in response to a printing instruction from a user, the printer driver 31 transmits discrimination data, which indicate that the printing process according to the invention would be performed, and a file name of a print controlling command file to the spooler 41. Here, the term "job" means a unit for a printing process performed in response to one printing instruction. It is not a matter whether the number of pages or sets to be printed is single or plural.

Then, the printer drive 31 processes the printing data, divides it into a plurality of sub-files 70, gives them a file name, and stores them in the external storing device 14. After that, the file name of the sub-files is transmitted to the spooler 41.

Now, processes by the printer driver 31 for processing the printing data and for dividing it into a plurality of sub-files 70 will be described.

Figure 2:
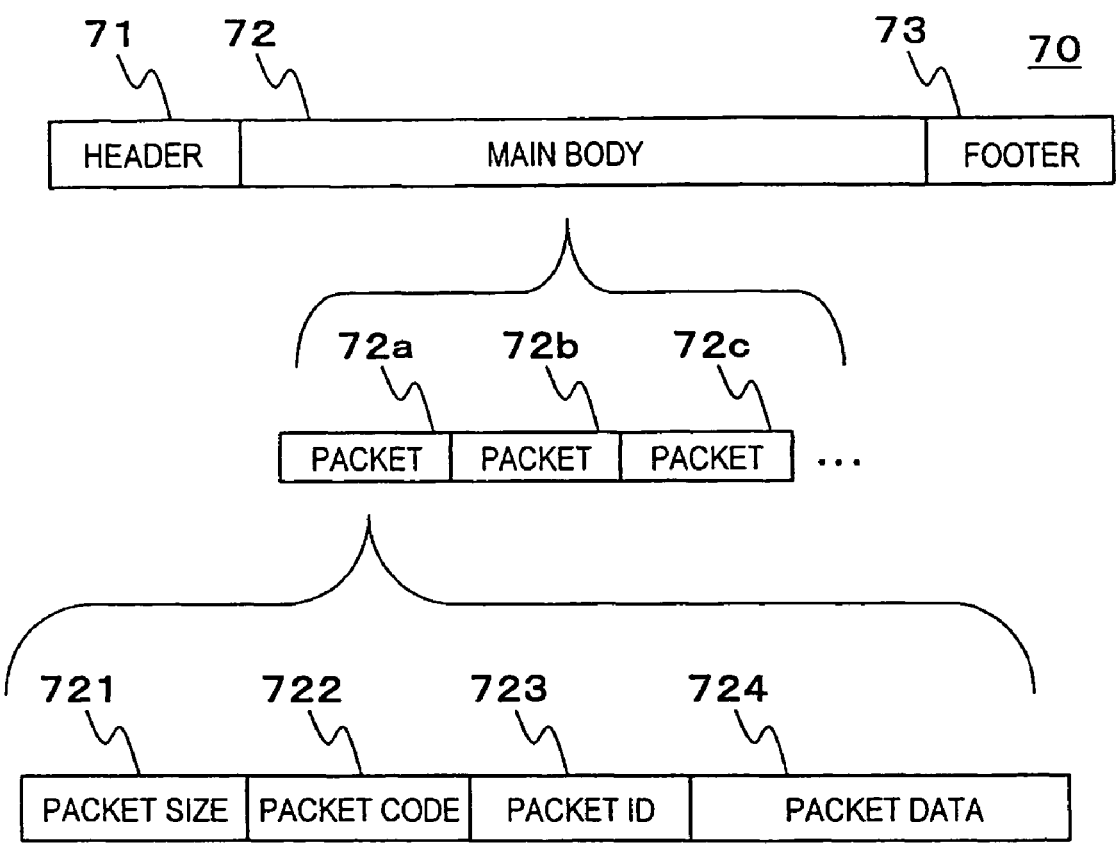
FIG. 2 is a schematic diagram for illustrating a sub-file.

FIG. 2 is a schematic diagram illustrating a sub-file 70. As shown in FIG. 2A, the sub-file 70 comprises a header portion 71, a main body portion 72, and a footer portion 73. The main body portion 72 further comprises packet portions (72*a*, 72*b*, . . . ) (FIG. 2B).

The header portion 71 is used for discriminating the type or such of the sub-file 70. The packet portions (72*a*, 72*b*, . . . ) have a code for discriminating the start of a job, a code for discriminating start of a page, printing data and such, respectively. The footer portion 73 is used for discriminating end of a sub-file. Both of the header portion 71 and the footer portion 73 may be adapted to comprise packets.

The packet portions (72*a*, 72*b*, . . . ) have a common format as shown in FIG. 2C. The packet portion 72*a* is variable in length and comprises a packet size portion 721, a packet code portion 722, a packet ID portion 723, and a packet data portion 724.

The packet size portion 721 stores therein a data size of the packet data 72*a*. The packet code portion 722 stores a code indicating the type of a packet. The packet ID portion 723 stores a code discriminating a data type of packet data 72*a* (a data type based on a packet type). The packet data portion 724 stores a main body of data.

A data structure of the print controlling command file 71 is same as that of the sub-file 70 described above. The both are discriminated by a content of the header portion 71.

FIG. 3 is a schematic diagram illustrating a process by the printer driver 31 for dividing printing data 52 into sub-files 70. In FIG. 3, 70*a*, 70*b*, and 70*c* are sub-files. Each sub-file comprises header portions (71*a*, 71*b*, and 71*c*), footer portions (73*a*, 73*b*, and 73*c*), and packet portions (72*a*, 72*b*, . . . ) each of which is a main body portion.

The printer driver 31 divides printing data into packets, integrates a few packets, and adds a header portion and a footer portion to the integrated packets to make them into a sub-file. Here, a unit for dividing into packets should be one packet for at least a printing command such as job start or page start, while the other printing data can be made into any size. A unit for integrating packets to make them into one sub-file is also optional. The order of the printing data, however, should be unchanged.

Figure 4A:
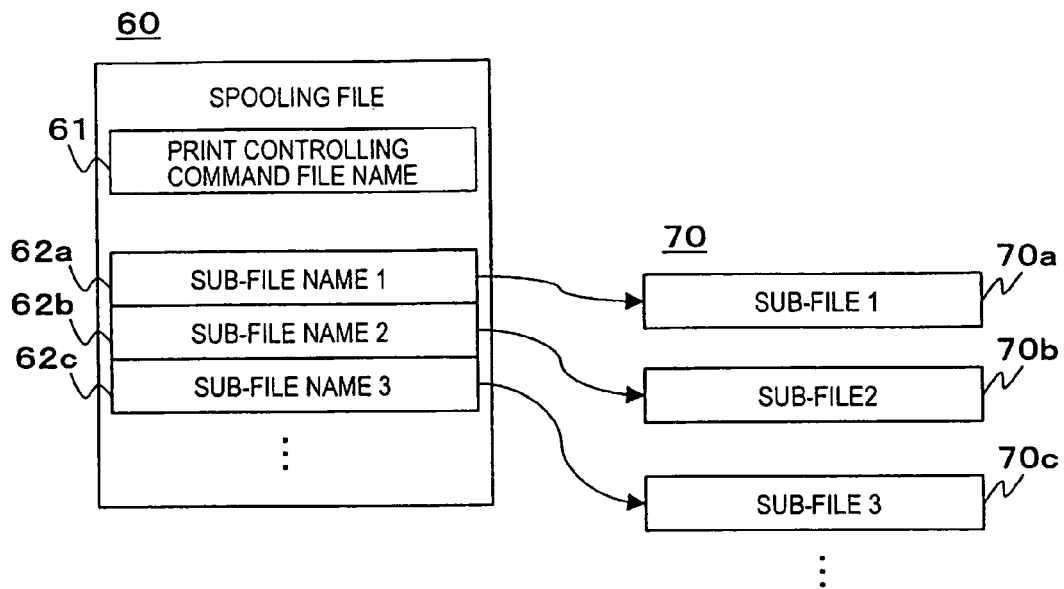
FIGS. 4A and 4B are schematic diagrams illustrating a relation between a spooling file and a sub-file.
Figure 4B:
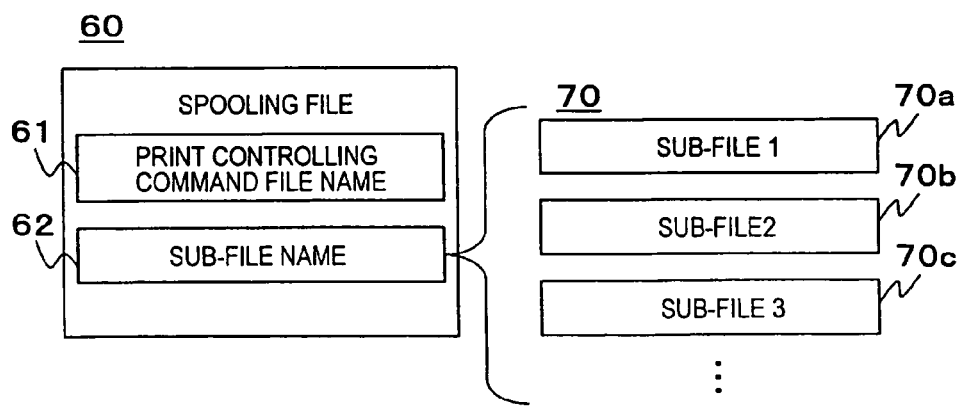

FIGS. 4A and 4B illustrate two examples of a relation between the sub-file 70 created by the printer driver 31 and a spooling file 60 created by the spooler 41, after a file name is transmitted from the printer driver 31 to the spooler 41.

FIG. 4A shows a method of holding all file-names of the created sub-files in the spooling file. In this drawing, the spooling file 60 comprises a print controlling command file name 61, a sub-file name 1, and a sub-file name 2 . . . (62*a*, 62*b*, . . . ). Each sub-file name can be any file name.

FIG. 4B shows a method of holding a common part of a file name of the created sub-file in a spooling file. In this drawing, the spooling file 60 comprises a print control command file name 61 and a sub-file name 62. Sub-file 1, sub-file 2, . . . and sub-file n would be possible to be specified in order by referring to the sub-file name 62. That is, a sequential number is assigned to a common part as a sub-file name.

Now, a process in the case that the printer driver 31 receives a cancellation instruction designated by a user will be described. The printer driver 31 writes a printer controlling command indicating cancellation into the print controlling command file 71 at once upon receiving a print cancellation instruction from a user. Thus, the cancellation instruction command can be formed quickly.

Next, an operation of the print processor 42 in the first embodiment will be described in detail.

The print processor 42 checks whether or not the spooling file 60 has discrimination data indicating that the printing operation according to the invention is performed, upon receiving a printing instruction from the printing system 40. When the discrimination data is detected, the following process is performed. The discrimination data is data that were transmitted from the printer driver 31, which has performed this process, to the spooler 41, which has written in the transmitted data into the spooler file 60.

The print processor 42 refers to the spooling file 60 to obtain the sub-file name 61 and the print controlling command file name 62. The print processor 42 opens the sub-file 70 corresponding to the first file name of the sub-file name 61 to read it in a unit of packet (including the header portion 71 and the footer portion 73). Then, the print processor 42 transmits the packet data portion 724, which is printing data, to the printer 20 in order.

When the print processor 42 reads in the footer portion 73, the sub-file completely read is closed and the sub-file 70 corresponding to the following file name of the sub-file name 61 is opened so that the similar process would be performed as well as the first sub-file completely read would be deleted. Thus, a capacity of the external storing device 14 can be practically saved. This process would be repeated hereinafter until the end of the printing data.

When the print processor 42 reads in a job end packet, printing would end, so that the last sub-file 70 would be closed and deleted.

The print processor 42 can start transmitting data to the printer without waiting for end of a sub-file of a whole job after the first sub-file is created. Therefore, it would be possible to shorten a waiting time until the start of printing.

The print processor 42 monitors the print controlling command file 71 for every reading of a file in a unit of a packet, for example. Timing of the monitor is not limited to a unit of a packet, of course. When the print processor 42 detects by such as increase of a file size of the print controlling command file 71 that the print controlling command file 71 is updated, it reads the print controlling command file 71.

When a print cancellation instruction is added to the print control command file 71 as a result of the reading, transfer of packets to the printer 20 after the cancellation would be stopped and a page ending command and job ending command would be transmitted to the printer 20, so that printing would end.

The above printing cancellation process enables detection of cancellation for every packet process, and printing can be stopped without transferring to the printer 20 packets after detection. That is, it become possible to perform cancellation of printing quickly and certainly.

Next, the second embodiment of the invention will be described with reference to drawings. In the second embodiment, the invention is applied to a computer system, in which a printer connected to a network is adapted to carry out plural sets of printing.

Figure 5:
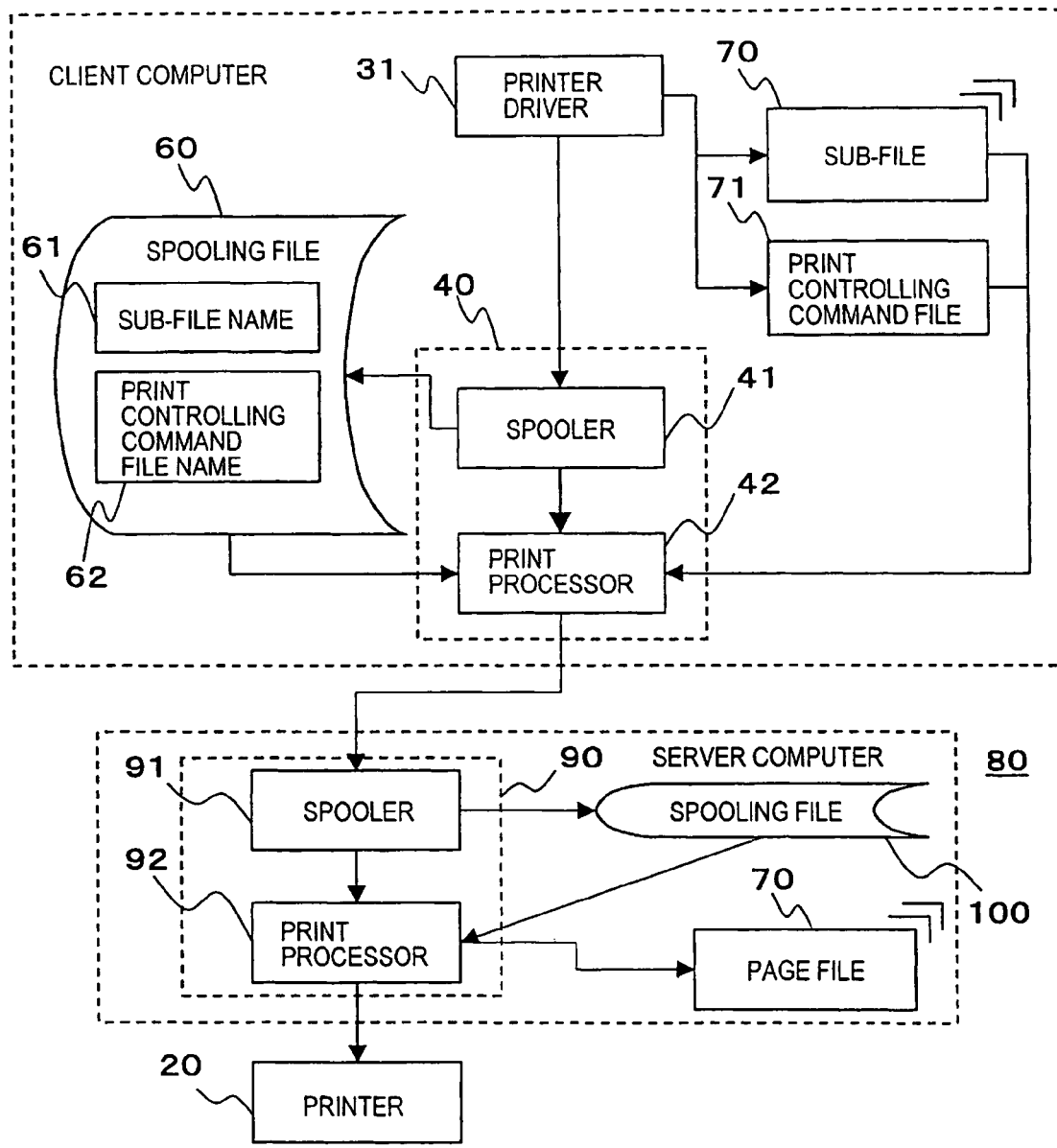
FIG. 5 is a block diagram illustrating an outline of a structure and process of a second embodiment.

First, a structure and a process of a computer system in the second embodiment will be described with reference to FIG. 5. A client computer 10 is same as the computer in the first embodiment. A server computer 80 is connected to the client computer 10 by a network, and further connected to the printer 20. The server computer 80 comprises a printing system 90, which comprises a spooler 91 and a print processor 92. Printing data of the client computer 10 is transmitted to the spooler 91 of the server computer 80, and then, transmitted through the print processor 92 to the printer 20. A hardware structure of the server computer 80 is same as that of the client computer 10, as shown in FIG. 8. Thus, the same reference numbers are used under a condition of specifying the client computer 10 and the server computer 80.

A process by a client computer 10 in this embodiment will be described.

After receiving a printing instruction from an operator, the printer driver 31 of the client computer 10 creates the spooling file 60, which includes a sub-file name 61 and the print controlling command file name 62, the sub-file 70, and the print controlling command file 71 same as in the first embodiment. The print processor 42 refers to the sub-file name 61 to open the sub-file 70 in order, and then, transmits it to the spooler 91 of the server computer 80 in a unit of packet to delete the completely transferred sub-file in order. Thereby, the external storing device 14 of the client computer 10 can be used effectively same as in the first embodiment.

The print processor 42 also transmits information concerning plural sets of printing, which is received from an operator, for example, the number of sets and the existence of collating to the spooler 91 of the server computer 80. Accordingly, it is not required in the plural sets of printing to transmit printing data corresponding to the plural sets of printing, so that the transferring time can be decreased and the print starting time can be advanced. Gathering printing is that, for example, printing is performed in the order of the first page, the second page, the third page, the first page, the second page, and the third page, in printing three pages of originals in two sets. On the other hand, non-gathering printing is that printing is performed in the order of the first page, the first page, the second page, the second page, the third page, and the third page.

Next, a process by the server computer 80, to which the above data has been transmitted, will be described. The spooler 91 stores transmitted printing data in a unit of a packet in the external storing device 14 of the server computer 80 as the spooling file 100.

The print processor 92 refers to information concerning plural sets of printing, which is transmitted from the client computer 10, so as to obtain the number of printing and information of the existence of gathering printing.

In the case that the plural sets of printing is not designated, the print processor 92 reads in the spooling file 100 in a unit of a packet and transmits in order the packet data 724 to the printer 20 so as to perform printing.

In the case that the plural sets of printing is designated, the print processor 92 reads in the spooling file 100 in a unit of a packet and temporally creates the page-file 110 for every page so as to store it in the external storing device 14 of the server computer 80.

Now, creation of the page-file 110 will be described. First, a file is created for storing printing data of a printing start page. Then, the packet data 724 is added to the file until a packet indicating end of a page would be read in. After the page ending packet is read, the file is closed so that a file would be created for storing printing data having a name of the following page. The above process is repeated until a packet of job end is read. Thus, the page file 110 for the number of printing pages is created.

FIG. 6 is a schematic diagram illustrating the above process. In the drawing, a reference number 100 denotes a spooling file in a unit of packet. The spooling file 100 comprises D1, D2, and D3, which are substance portions of printing, PE1 and PE2, which indicate end of a page, and JE, which indicates end of a job. 110a and 110b are page-files. The print processor 92 reads the spooling file 100 to create two page-files 110a and 110b by using the end of a page PE1 and PE2 as a separator.

The above process requires no spooling file for plural sets even when plural sets of printing are designated, so that it would be possible to effectively use the external storing device 14 of the server computer 80.

In the case of non-gathering printing, the above page-file 110 is repeated for the designated sets so as to be transmitted to the printer 20 in order of page, so that the completely transferred page-file 110 is deleted in order.

Figure 7A:
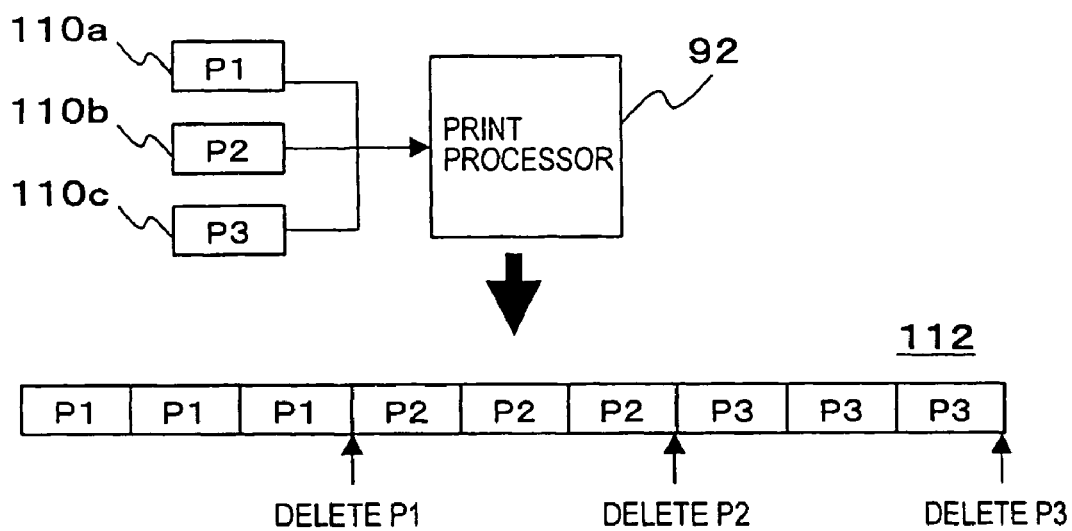
FIGS. 7A and 7B are schematic diagrams for illustrating plural copy print.

FIG. 7A is a schematic diagram illustrating the above process. In this drawing, 110a, 110b and 110c denote page-files. It is assumed that these are printed for three sets by decollating. Reference number 112 denotes data to be transmitted to the printer 20. The Print processor 92 transmits three sets of page-file 110a of the printing start page P1 to the printer 20 so as to delete P1 page-file 110a. Then, the same process is performed for the P2 page-file 110b and P3 page-file 110c to end printing.

Accordingly, deletion of a page-file in order after the completion of printing allows to effectively use the external storing device 14 of the server computer 80.

In the case of gathering printing, a process for transmitting the page-file 110 to the printer 20 in order of page is repeated for the designated sets. Then, a temporary file is deleted after the process ends.

Figure 7B:
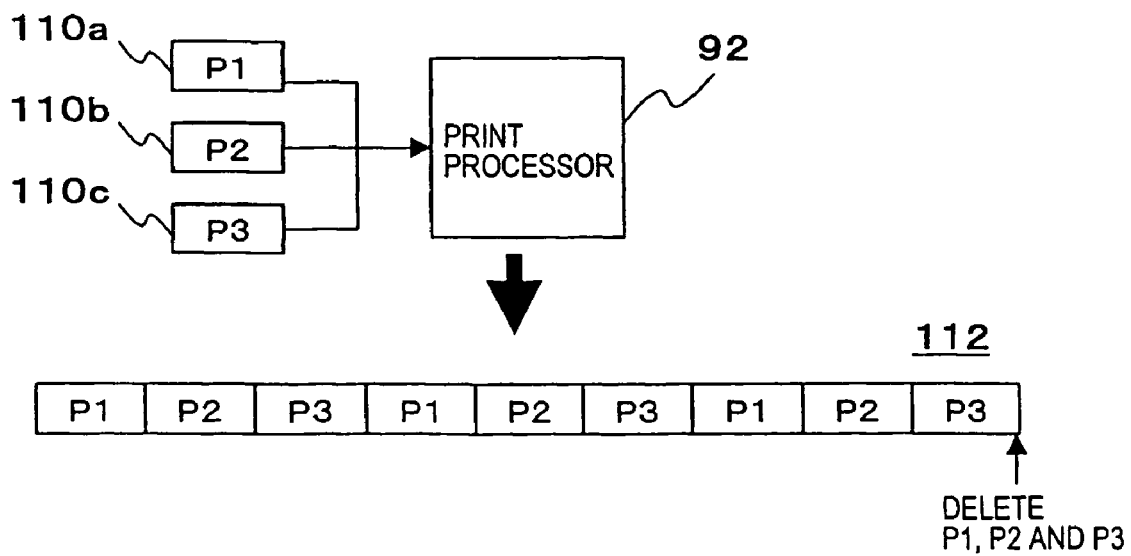

FIG. 7B is a schematic diagram illustrating the above process. The meanings of reference numbers are same as those of FIG. 7A. It is assumed that three sets are printed by gathering printing. The print processor 92 transmits a page-file 110a of a print starting page P1, a page-file 10b of P2, and a page file 110c of P3 to the printer 20 in order. This is repeated for three times, the number of which is the number of printing sets, and at last, the page-file 110a, 110b, and 110c are deleted to end printing.

There is no need to mention that a process of plural sets of printing can be also applied to printing by a local-connected printer not only to printing by a network-connected printer.

As described above, according to the invention, it would be possible in printing that the time, which, the storing area of the external storing device is occupied by the printing data can be shortened. Furthermore, according to the invention, it would be possible in printing that a printing cancellation command is created and detected quickly so that the transfer of the printing data after the detection is certainly stopped.

What is claimed is:

1. A computer readable medium storing a program for enabling a computer to perform a process for reading and outputting printing data, which controls a printer, wherein said program enables the computer to implement:

a determining process for determining whether or not a print spooling file includes information for specifying one file among plural files that include printing data, said information being stored separately from the plural files;

a process for reading said print spooling file to refer to information for specifying said file when a determination is made that the print spooling file includes the information for specifying the file;

a process for reading the specified file to output printing data included in the file; and a process for deleting a file including the outputted printing data;

a process for determining whether or not the print spooling file includes information concerning an instruction of plural sets of printing;

a process for reading the specified file to create and record a file comprising printing data in a unit of page;

a process for outputting printing data included in the file when it is determined that the print spooling file includes information concerning an instruction of plural sets of printing; and a process for referring to said file comprising printing data in a unit of page in accordance with an instruction of plural sets of printing to output the printing data in a unit of page plural times.

* * * * *